(12) United States Patent
Ishibashi et al.

(10) Patent No.: US 9,768,438 B2
(45) Date of Patent: Sep. 19, 2017

(54) DEVICE FOR INJECTING LIQUID ELECTROLYTE INTO BATTERY

(71) Applicant: NISSAN MOTOR CO., LTD., Yokohama-Shi, Kanagawa (JP)

(72) Inventors: Keisho Ishibashi, Kanagawa (JP); Ryo Inoue, Kanagawa (JP); Natsumi Satoh, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/038,576

(22) PCT Filed: Oct. 17, 2014

(86) PCT No.: PCT/JP2014/077665
§ 371 (c)(1),
(2) Date: May 23, 2016

(87) PCT Pub. No.: WO2015/087617
PCT Pub. Date: Jun. 18, 2015

(65) Prior Publication Data
US 2016/0301062 A1     Oct. 13, 2016

(30) Foreign Application Priority Data
Dec. 9, 2013   (JP) .................................. 2013-253727

(51) Int. Cl.
*H01M 2/36* (2006.01)
*H01M 10/052* (2010.01)
(Continued)

(52) U.S. Cl.
CPC ............. *H01M 2/361* (2013.01); *H01M 2/36* (2013.01); *H01M 2/362* (2013.01);
(Continued)

(58) Field of Classification Search
CPC ........... H01M 10/052; H01M 10/0525; H01M 10/0585; H01M 2/021; H01M 2/024;
(Continued)

(56) References Cited

U.S. PATENT DOCUMENTS

| 8,343,240 | B2 | 1/2013 | Shimura et al. |
| 2005/0151549 | A1* | 7/2005 | Okumura ........... G01R 31/2898 324/750.03 |
| 2011/0005050 | A1* | 1/2011 | Shimura ................. H01G 9/08 29/25.03 |

FOREIGN PATENT DOCUMENTS

| JP | 8130004 A | 5/1996 |
| JP | H0935704 A | 2/1997 |

(Continued)

*Primary Examiner* — Timothy L Maust
*Assistant Examiner* — Andrew Schmid
(74) *Attorney, Agent, or Firm* — Young Basile Hanlon & MacFarlane, P.C.

(57) ABSTRACT

A device for injecting a liquid electrolyte into a battery addresses a problem that the injection amount of the liquid electrolyte becomes excessive because the liquid electrolyte volatizes at injection if remaining in a chamber. The device has a liquid injecting pump for injecting the liquid electrolyte into the battery positioned inside the chamber which has been sealed in a depressurized state and a vacuum pump for depressurizing the inside of the chamber. A vacuum attainment time until a pressure of the inside of the chamber becomes in a predetermined vacuum state is measured, and if this vacuum attainment time becomes longer than a predetermined value, the injection amount of the liquid electrolyte is corrected downwards.

3 Claims, 7 Drawing Sheets

(51) Int. Cl.
  *H01M 2/02*  (2006.01)
  *H01M 4/66*  (2006.01)
  *H01M 10/0525*  (2010.01)
  *H01M 10/0585*  (2010.01)
  *H01M 4/02*  (2006.01)

(52) U.S. Cl.
  CPC .......... *H01M 10/052* (2013.01); *H01M 2/021* (2013.01); *H01M 2/024* (2013.01); *H01M 4/661* (2013.01); *H01M 10/0525* (2013.01); *H01M 10/0585* (2013.01); *H01M 2004/027* (2013.01); *H01M 2004/028* (2013.01)

(58) Field of Classification Search
  CPC ........ H01M 2/36; H01M 2/361; H01M 2/362; H01M 2004/028; H01M 2004/027
  See application file for complete search history.

(56) References Cited

FOREIGN PATENT DOCUMENTS

| | | |
|---|---|---|
| JP | 2009224159 A | 10/2009 |
| JP | 3174417 U | 3/2012 |
| JP | 2013077404 A | 4/2013 |
| JP | 2013140783 A | 7/2013 |

\* cited by examiner

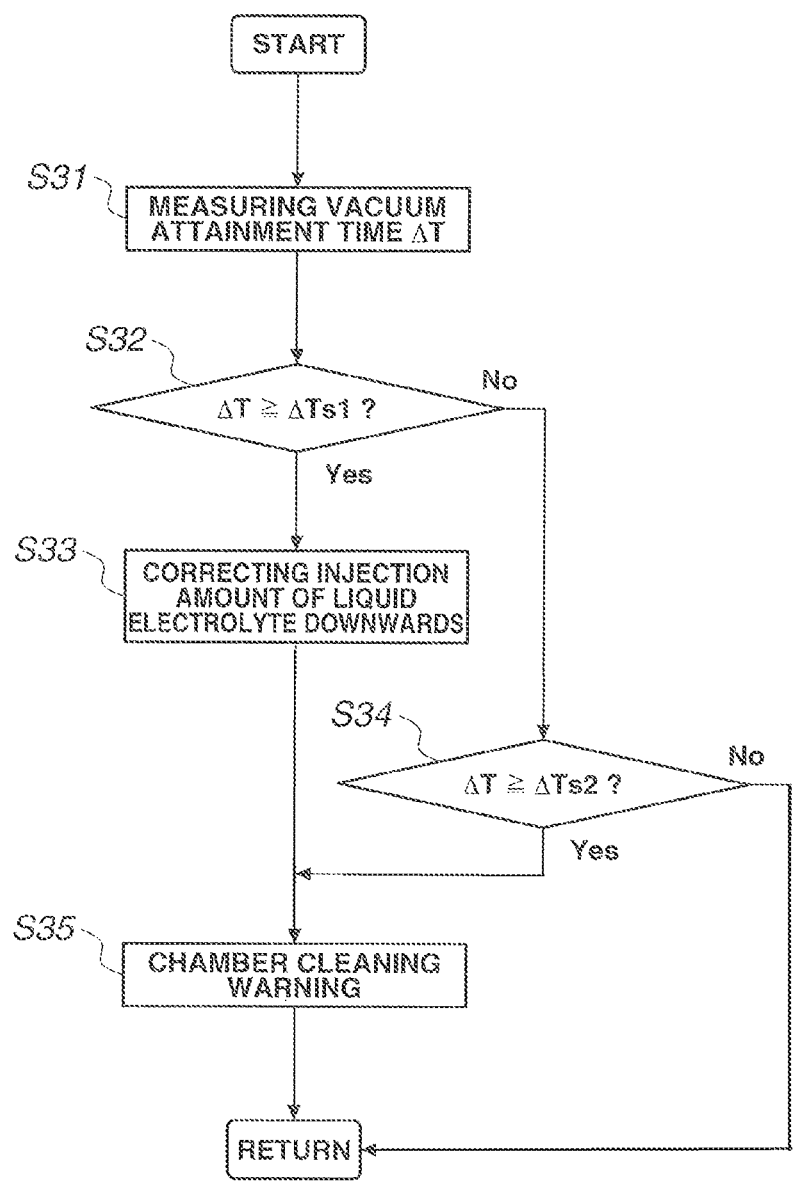

DEVICE FOR INJECTING LIQUID ELECTROLYTE INTO BATTERY

CROSS REFERENCE TO RELATED APPLICATION

The present application claims priority to Japanese Patent Application No. 2013-253727, filed Dec. 9, 2013, incorporated herein in its entirety.

TECHNICAL FIELD

The present invention relates to improvement of a liquid electrolyte injecting device for injecting a liquid electrolyte into a battery in the inside of a chamber that has been sealed in a vacuum state.

BACKGROUND

As a device for injecting a liquid electrolyte into a battery, there has been known a technique for injecting the liquid electrolyte into the battery in the inside of a chamber under a vacuum environment which has been sealed in a depressurized state (see Japanese Patent Application Publication H9-35704).

SUMMARY

In the injection in this vacuum state, the liquid electrolyte is inevitably volatilized. Therefore, as to setting of the injection amount of the liquid electrolyte by the liquid injecting pump, the volatilization amount that the liquid electrolyte will be volatilized is considered in advance, and the injection amount is set by adding the volatilization amount to a prescribed injection amount of the liquid electrolyte actually required for the inside of the battery.

However, at the time of the injection, it is not possible to completely suppress scattering the liquid electrolyte in the chamber. Consequently, when the injection is repeated, some amount of the liquid electrolyte scattered in the chamber adheres to and remains on an inner wall surface, etc., of the chamber.

In addition, the liquid electrolyte remaining in the chamber is not completely volatilized even in the vacuum state. The liquid electrolyte remaining in the chamber therefore cannot be completely removed even if the inside of the chamber is depressurized to a predetermined vacuum state once. That is, if the injection is repeated, some amount of the liquid electrolyte inevitably remains in the chamber.

In this way, if the liquid electrolyte remaining in the chamber reaches at a predetermined level, this liquid electrolyte remaining in the chamber is volatilized at the time of the depressurization and the injection. A liquid electrolyte during the injection which had been expected to be volatilized is therefore not volatilized, and the volatilization amount of the liquid electrolyte during the injection decreases. Consequently, the injection amount of the liquid electrolyte to be injected into the battery becomes excessive. In this way, if the injection amount becomes excessive, it causes deterioration in quality, such as overweight, and a failed product is produced.

The present invention has been made in consideration of such a situation. An object of the present invention is to provide a new device for injecting the liquid electrolyte into the battery which is capable of properly keeping the injection amount of the liquid electrolyte even in a case where the liquid electrolyte remains in the chamber with time caused by the repetition of the injection.

A device for injecting a liquid electrolyte into a battery according to the present invention has a liquid injecting pump for injecting the liquid electrolyte into the battery positioned inside a chamber which has been sealed in a depressurized state and a vacuum pump for depressurizing the inside of the above chamber. In addition, a vacuum attainment time until the pressure of the inside of the chamber becomes in a predetermined vacuum state by this vacuum pump is measured, and the injection amount of the above liquid electrolyte is corrected according to the vacuum attainment time.

In a case where the liquid electrolyte remains in the chamber, while the pressure of the inside of the chamber is depressurized from approximately atmospheric pressure to the predetermined vacuum state, that is, evacuation, the vacuum attainment time until the pressure of the inside of the chamber becomes in the vacuum state becomes longer because the remaining liquid electrolyte is volatilized. Therefore, by this vacuum attainment time, it is possible to judge whether the liquid electrolyte remains in the chamber. Specifically, if the vacuum attainment time becomes longer, it is judged that the liquid electrolyte remains in the chamber, and by correcting the injection amount of the liquid electrolyte downwards, the injection amount can be adjusted properly.

As mentioned above, according to the present invention, even in a case where the liquid electrolyte remains in the chamber with time caused by repeating the injection, the injection amount of the liquid electrolyte can be properly kept.

DESCRIPTION OF THE DRAWINGS

FIG. 7 is a flow chart showing a control flow in which the injection amount of the liquid electrolyte is corrected downwards.

DETAILED DESCRIPTION OF THE EMBODIMENTS

Figure 1:
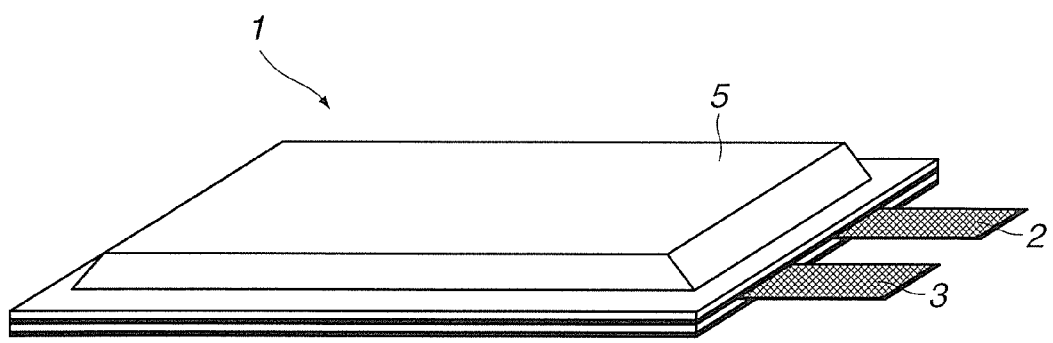
FIG. 1 is a perspective view showing a film outer case battery to which a device for injecting a liquid electrolyte into a battery according to the present invention is applied.
Figure 2:
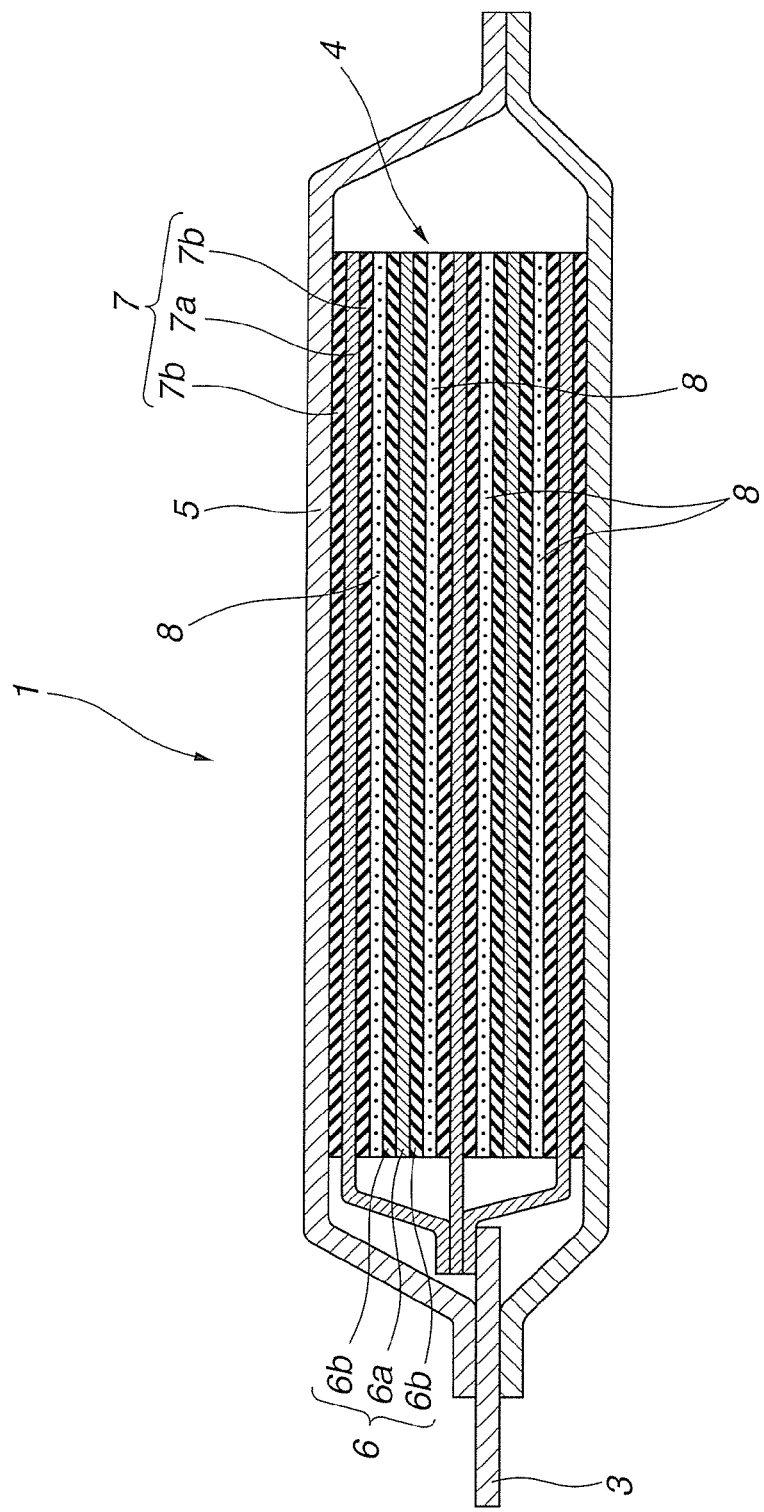
FIG. 2 is a sectional view showing the above film outer case battery.

In the following, the present invention is explained according to the embodiment shown in the drawings. First, a film outer case battery that is one embodiment of a battery into which a liquid electrolyte is injected is explained with reference to FIG. 1 and FIG. 2. This film outer case battery 1 is, for example, a lithium ion secondary battery. Film outer case battery 1 has a flat rectangular appearance shape. A pair of terminals 2 and 3 made of a conductive metal foil is equipped at one of end edges in a longitudinal direction of film outer case battery 1. This film outer case battery 1 is one in which rectangular electrode laminated body 4 is accommodated with the liquid electrolyte in outer case body 5 made of a laminated film. The above electrode laminated body 4 has a structure in which a plurality of positive electrode plates 6 and negative electrode plates 7 are alternately laminated through separators 8. The plurality of positive electrode plates 6 are connected to positive electrode terminal 2. Similar to this, the plurality of negative electrode plates 7 are connected to negative electrode terminal 3. Positive electrode plate 6 is one in which both surfaces of positive electrode current collector 6a made of a metal foil, such as an aluminum foil, are coated with positive electrode active material layer 6b. The same as this, negative electrode plate 7 is one in which both surfaces of negative electrode current collector 7a made of a metal foil, such as an aluminum foil, are coated with negative electrode active material layer 7b.

Outer case body 5 has a structure formed by two laminated films, and one of the laminated films is provided at an under surface side of electrode laminated body 4 and the other is provided on a top surface side of electrode laminated body 4. Four sides of the periphery of these two laminated films are overlapped and heat-welded each other along those edges. The pair of terminals 2 and 3 positioned at a short side of rectangular film outer case battery 1 is drawn out through a joint surface of the laminated films when the laminated films are heat-welded each other.

In addition, in the embodiment shown in the drawings, the pair of terminals 2 and 3 is arranged side by side at the same one of the edges. However, positive electrode terminal 2 can be arranged at one of the edges and negative electrode terminal 3 can be arranged at the other edge.

A manufacturing procedure of the above film outer case battery 1 is as follows. First, in a laminating step, electrode laminated body 4 is formed by laminating positive electrode plates 6, negative electrode plates 7 and separators 8 in order and attaching terminals 2 and 3 by spot-welding. Next, this electrode laminated body 4 is covered with the laminated films that become outer case body 5 and three sides of the periphery of this laminated films are heat-welded each other except one side. Next, the liquid electrolyte is injected into outer case body 5 through an open one side and it is filled with the liquid electrolyte, following which, by heat-welding the open one side, outer case body 5 becomes in a sealed state. With this, film outer case battery 1 is completed. Next, film outer case battery 1 is charged to a proper level. In this state, aging of film outer case battery 1 is conducted for a certain period of time. After finishing this aging, film outer case battery 1 is charged again for a voltage inspection, and then is shipped.

In addition, film outer case battery 1 of this type is used as a battery module in which a plurality of film outer case batteries 1 are accommodated in a flat box-shaped casing. In this case, it has an arrangement in which the plurality of film outer case batteries 1 are stacked in the casing of the battery module. For example, outer case body 5 can be in a state of being slightly pressed in a laminating direction of electrode laminated body 4 (direction orthogonal to a main surface of electrode laminated body 4) by a part of the casing or an elastic member different from the casing.

As an organic liquid solvent used for the liquid electrolyte, in addition to ester based solvents such as propylene carbonate (PC), ethylene carbonate (EC), dimethyl carbonate (DMC) and methyl ethyl carbonate, it is possible to use ether based solvents such as γ-butyrolactone (γ-BL) and diethoxyethane (DEE). Furthermore, it is possible to use an organic liquid solvent in which other solvents are mixed and prepared.

Figure 3:
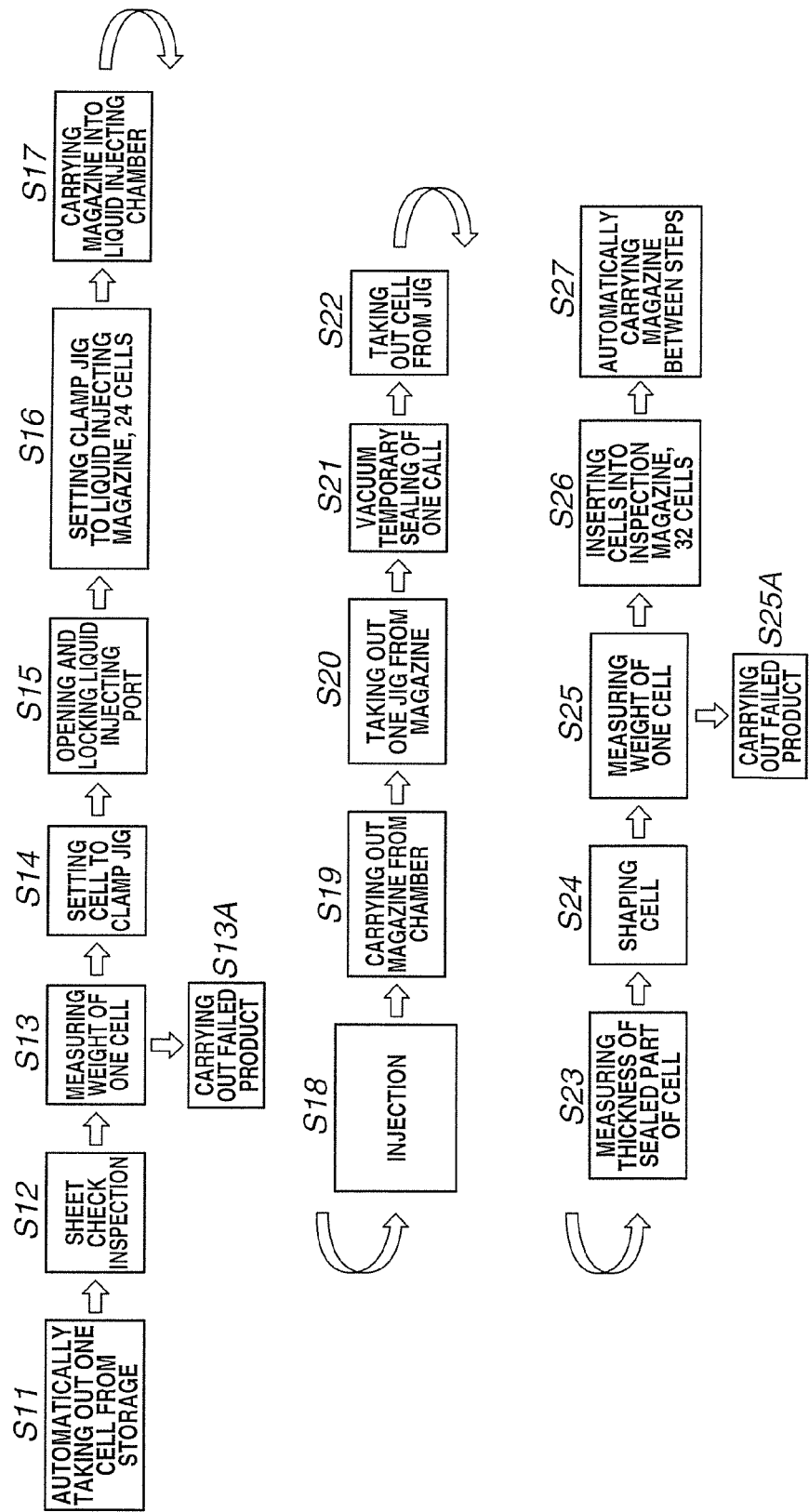
FIG. 3 is a block diagram showing flow of an injection step.

FIG. 3 is an explanation drawing simply showing an injection step that is a part of a manufacturing step of film outer case battery 1.

In step S11, one film outer case battery 1 (in the following, it is also called "cell") is automatically taken out from a storage. In step S12, a sheet check inspection of this one cell is carried out. In step S13, the weight of this one cell is measured. If the weight of this one cell does not satisfy a predetermined weight range, that is, this one cell is a failed product, the step moves on to step S13A, and this one cell is carried out as a failed product and excluded from this injection step.

In step S14, the cell is set to a clamp jig. In step S15, one of the sides (top side) which becomes a liquid injecting port of film outer case battery 1 is opened by a cutter, etc., and is positioned and locked to the clamp jig. In step S16, a plurality of the clamp jigs respectively holding the cells (in this embodiment, 24 cells) are set to a liquid injecting magazine. In step S17, the liquid injecting magazine is carried into the after-mentioned chamber 14 used for the injection.

In step S18, the liquid electrolyte is injected into each of the cells respectively held by the jigs. When the injection finishes, the step moves on to step S19, and the magazine is carried out from chamber 14. In step S20, one jig is taken out from the magazine. In step S21, vacuum temporary sealing of one cell held by the taken-out jig is performed. In step S22, the cell is taken out from the jig. In step S23, thickness of a sealed part of the cell is measured. In step S24, the cell is shaped, that is, distortion and twisting of the cell are corrected. In step S25, similar to the above step S13, the weight of the one cell is measured again. If the thickness measured in step S23 and the weight measured in step S25 of this one cell do not satisfy predetermined ranges, that is, this one cell is a failed product, the step moves on to step S25A, and it is carried out as a failed product and excluded from this injection step. In step S26, a plurality of normal cells (in this embodiment, 32 cells) which had passed the inspections of step S23 and step S25 are inserted into an inspection magazine. In step S27, the magazine is automatically carried to a next inspection step.

Figure 4:
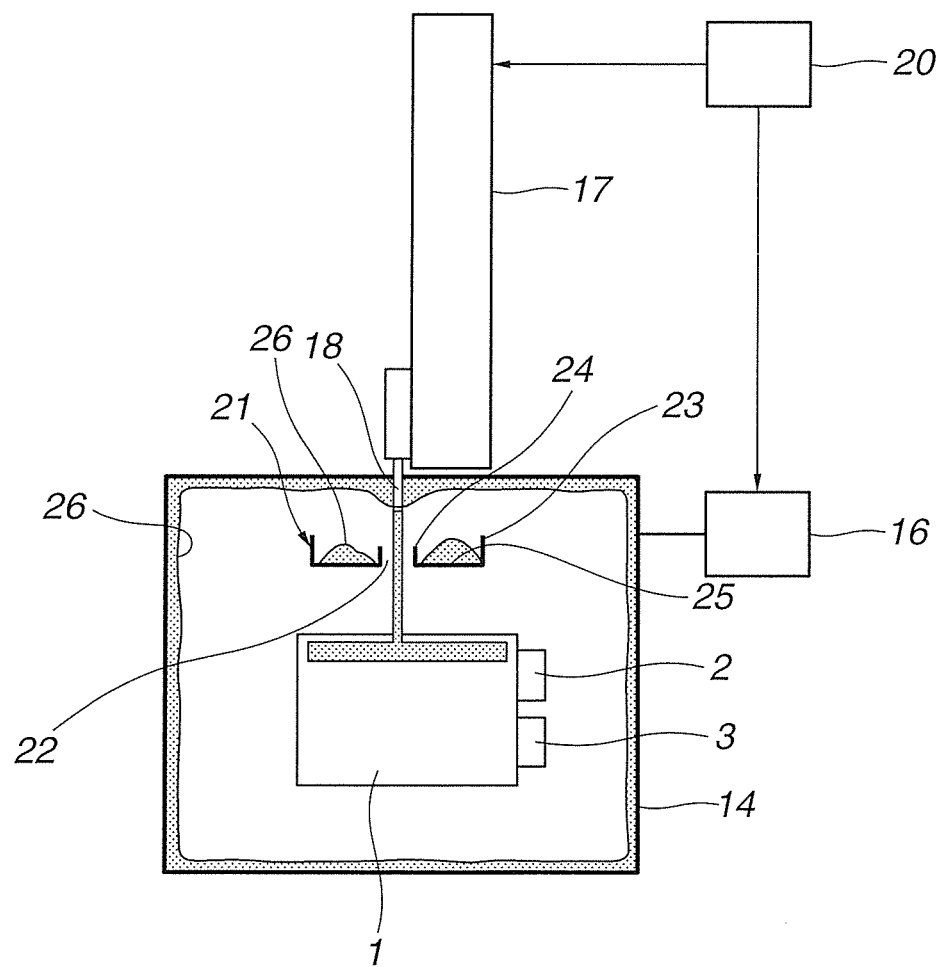
FIG. 4 is an explanation drawing showing a whole configuration of the liquid injecting device of the present embodiment.
Figure 5:
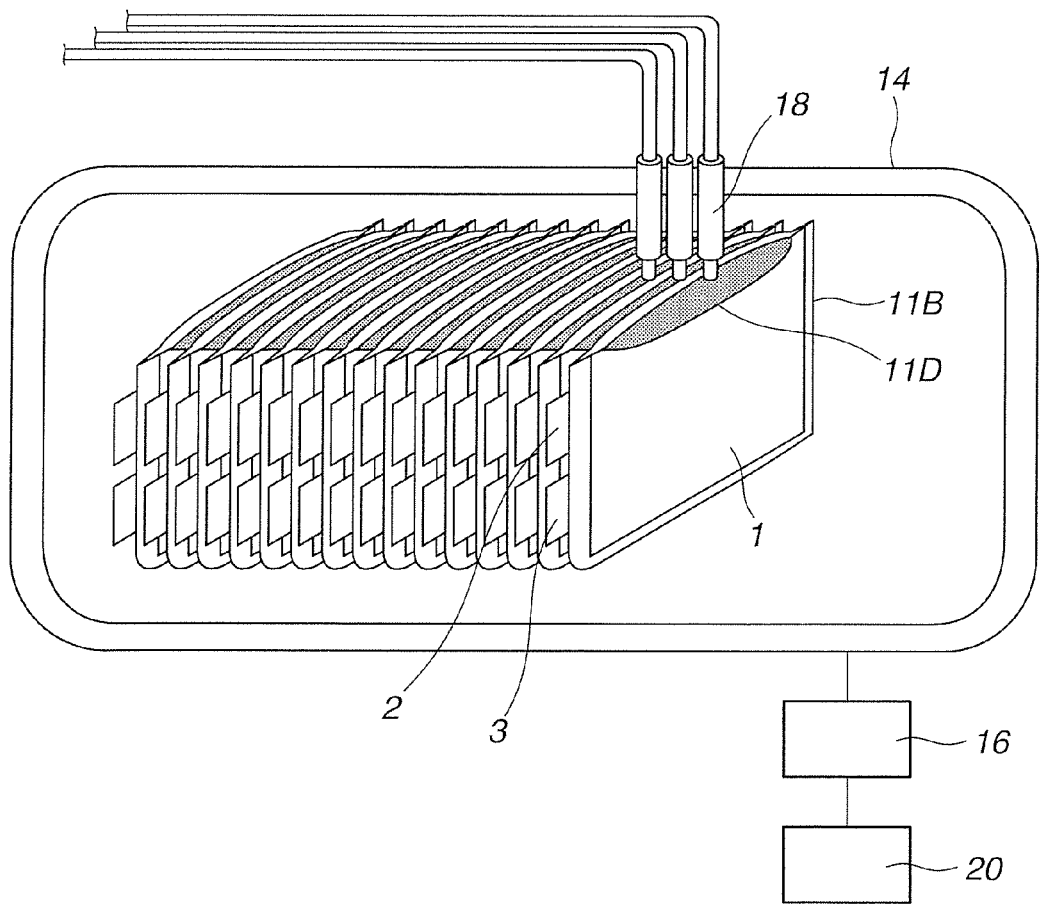
FIG. 5 is also an explanation drawing showing the whole configuration of the liquid injecting device of the present embodiment.

With reference to FIG. 4 and FIG. 5, the inside of chamber 14 at which a liquid injecting magazine (not shown in the drawings) is accommodated is depressurized by constant pressure type vacuum pump 16 and is sealed in a predetermined vacuum state. In the inside of chamber 14 under the vacuum state, the liquid electrolyte is injected into the cell by liquid injecting nozzle 18 of liquid injecting pump 17. In this embodiment, the injection is divided into four sets and performed by six liquid injecting nozzles 18 to 24 cells which are positioned in chamber 14. Operation of these liquid injecting pump 17 and vacuum pump 16 is controlled by control portion 20.

In addition, the injection is divided into a plurality of times (in this embodiment, seven times) and is performed to each of the cells so as to excellently impregnate the liquid electrolyte into the cell. In the injections of a first half, a vacuum degree is set to be high (that is, pressure is low) to mainly release a gas inside the cell. Specifically, the vacuum degree is set at a high vacuum degree of 20 hPa or lower. On the other hand, in the injections of a second half, the vacuum degree is set to be low (that is, pressure is high) to mainly sufficiently impregnate the liquid electrolyte to a part where the gas had been released of the inside of the cell. Specifically, the vacuum degree is set at a low vacuum degree of approximately 200 hPa.

In addition, in a situation except at the time of the injection (for example, at the time when the cell into which the liquid electrolyte is injected is changed), tray 21 is supported to receive a liquid electrolyte dropping down from liquid injecting nozzle 18 in chamber 14 so as not to adhere the liquid electrolyte dropping down from injecting nozzle 18 to a surface, etc., of film outer case battery 1. As to this tray 21, nozzle opening portion 22 through which liquid injecting nozzle 18 is inserted is opened in the middle portion of tray 21. Flange portions 23 and 24 standing upwardly are bent and formed at an inner peripheral edge and an outer peripheral edge of tray 21. Storage portion 25 to receive the liquid electrolyte is formed between both of these flange portions 23 and 24. This tray 21 is supported so as to move upwardly and downwardly in chamber 14. Tray 21 is put on standby at a position lower side than liquid injecting nozzle 18 except at the time of the injection, and, at the time of the injection, tray 21 is moved upwardly and liquid injecting nozzle 18 is inserted through nozzle opening portion 22.

Basically, the injection amount of the liquid electrolyte to be injected is set to an amount obtained by adding, in anticipation of the volatilization amount that is an amount of the liquid electrolyte in which the liquid electrolyte will be volatilized in liquid injecting chamber 14 during the injection, this volatilization amount to a prescribed injection amount required for each of the cells. That is, the injection amount is set to be larger than the prescribed injection amount in consideration of the volatilization amount. However, as shown in FIG. 4, sherbet-like liquid electrolyte 26 inevitably remains on an inner wall surface of chamber 14 and in storage portion 25 of tray 21 because injection work is repeatedly performed. In this way, in a situation in which liquid electrolyte 26 remains in chamber 14, since liquid electrolyte 26 remaining in chamber 14 is volatilized at the time of the depressurization and the injection, the volatilization amount of the liquid electrolyte during the injection relatively decreases. Consequently, the injection amount of the liquid electrolyte to be injected into the battery tends to be excessive.

Figure 6:
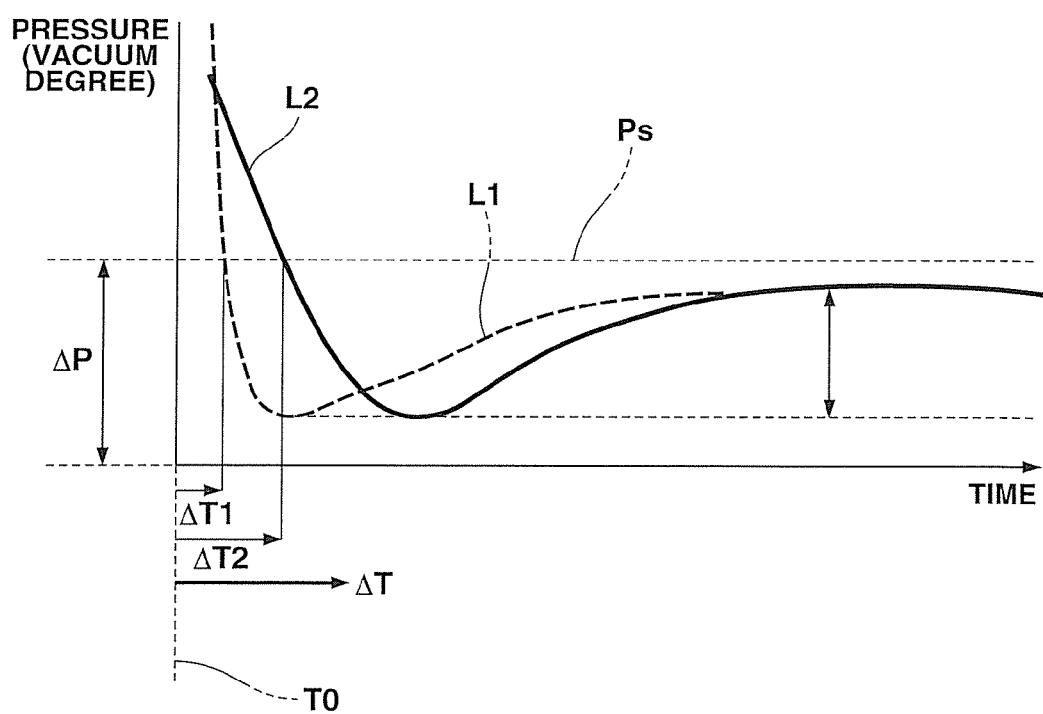
FIG. 6 is an explanation drawing showing a relation between pressure and time at the time of depressurization of a chamber.

With reference to FIG. 6, broken line L1 shows a depressurization characteristic in a clean state in which the liquid electrolyte does not remain in chamber 14. Broken line L2 shows a depressurization characteristic in a state in which the liquid electrolyte exceeding a predetermined level remains in chamber 14. As shown in the same drawing, as compared with a case where the liquid electrolyte does not remain (characteristic L1), in a case where the liquid electrolyte remains (characteristic L2), lowering of pressure becomes gentle and slow because volatilization of the liquid electrolyte remaining and appearing in chamber 14 occurs. As this result, as to vacuum attainment time $\Delta T$ until the pressure of the inside of chamber 14 becomes in vacuum state $\Delta P$ that is equal to predetermined value Ps or lower from depressurization starting point t0 (in a state at approximately atmospheric pressure) by vacuum pump 16, in a case where the liquid electrolyte remains ($\Delta T2$), it becomes longer than a case where the liquid electrolyte does not remain ($\Delta T1$) ($\Delta T2 > \Delta T1$).

In the present embodiment, a remaining state of the liquid electrolyte in chamber 14 is estimated based on vacuum attainment time $\Delta T$, the injection amount of the liquid electrolyte is corrected, and warning is given. FIG. 7 is a flow chart showing these control flows of the present embodiment. For example, the present routine is repeatedly performed by the above control portion 20.

In step S31, there is measured vacuum attainment time $\Delta T$ until the pressure of the inside of chamber 14 becomes at predetermined value Pa or lower from depressurization starting point t0 (at approximately atmospheric pressure) by vacuum pump 16. In step S32, it is judged whether this vacuum attainment time $\Delta T$ is equal to first predetermined value $\Delta Ts1$ or longer. If vacuum attainment time $\Delta T$ is equal to first predetermined value $\Delta Ts1$ or longer, it is judged that the liquid electrolyte at the predetermined level remains in chamber 14, the step moves on to step S33, and the injection amount of the liquid electrolyte is corrected downwards. For example, in advance, first predetermined value $\Delta Ts1$ is set as a value obtained by increasing the depressurization time by approximately ten percent with respect to the vacuum attainment time in the clean state in which the liquid electrolyte does not remain in chamber 14.

In step S34, it is judged whether vacuum attainment time $\Delta T$ is equal to second predetermined value $\Delta Ts2$ or longer. This second predetermined value $\Delta Ts2$ is a value smaller than first threshold $\Delta Ts1$. If vacuum attainment time $\Delta T$ is equal to second predetermined value $\Delta Ts2$ or longer, it is not necessary to reduce the injection amount, it is however judged that some amount of the liquid electrolyte remains in chamber 14, the step moves on to step S35, and warning is given to urge workers to clean off the liquid electrolyte remaining in chamber 14. This warning is given with sound, lamps, etc.

In addition, in this embodiment, in the injection which is divided into seven times and performed to each of the calls, the injection amount of the liquid electrolyte is corrected at the final injection. The reason for this is to absorb an error of the injection amount caused by an initial ability of each of liquid injection pumps 17. To absorb the error, the injection amount of each of the liquid injection pumps 17 is corrected at the final injection, and the injection amount of the liquid electrolyte injected by each of the liquid injecting pumps 17 is different. Therefore, at the final injection when the error of the injection amount caused by individual differences of liquid injecting pumps 17 is corrected, by also correcting the injection amount of the liquid electrolyte based on the above-mentioned vacuum attainment time $\Delta T$, at the time of the injections except this final injection, the injection amount of the liquid electrolyte of all of liquid injecting pumps 17 can be set to the same amount.

From the above, in the present embodiment, the injection amount of the liquid electrolyte is corrected according to vacuum attainment time $\Delta T$. More specifically, in a case where vacuum attainment time $\Delta T$ is equal to first predetermined value $\Delta Ts1$ or longer, the injection amount is corrected downwards. With this, even in the case where the liquid electrolyte remains in chamber 14 with time caused by repeating the injection, it is possible to suppress the injection amount of the liquid electrolyte from being excessive, and the injection amount can be adjusted properly.

In addition, if the liquid electrolyte remains in chamber 14, as compared with a case where the liquid electrolyte does not remain in chamber 14, the vacuum attainment time becomes longer and working hours become longer. In addition to those, there is a problem that air bleeding of the inside of the cell by the depressurization tends not to be excellently performed. In the present embodiment, in a case where vacuum attainment time $\Delta T$ is equal to second predetermined value $\Delta Ts2$ or longer, by giving warning to workers, it is possible to make the workers recognize that the liquid electrolyte remains in chamber 14 and urge the workers to clean chamber 14.

In the above, although the present invention was explained based on the specific embodiment, the present invention is not limited to the above embodiment, and can be changed and modified.

For example, in a case where the injection is divided into a plurality of times and performed and, in the middle of that, the pressure of the inside of chamber 14 is increased like the above embodiment, a time required for the increase of this pressure can be used as vacuum attainment time $\Delta T$. In this case, in a case where vacuum attainment time $\Delta T$ is short, it is judged that the liquid electrolyte remains in the chamber, and the injection amount of the liquid electrolyte is corrected downwards.

In addition, in the above embodiment, the injection amount of the liquid electrolyte is corrected at the final injection of the plurality of the injections. However, it is not limited to this, the injection amount of the liquid electrolyte can be corrected at an arbitrary injection time including a plurality of times.

The invention claimed is:

1. A device for injecting a liquid electrolyte into a battery, comprising:
   a liquid injecting pump for injecting the liquid electrolyte into the battery positioned inside a chamber which has been sealed in a depressurized state;
   a vacuum pump for depressurizing the inside of the chamber; and
   a controller configured to:
      measure a vacuum attainment time until a pressure of the inside of the chamber becomes in a predetermined value, and
      correct an injection amount of the liquid electrolyte according to the vacuum attainment time,
   wherein the vacuum attainment time is a time required for reducing the pressure of the inside of the chamber to the predetermined value starting from the depressurization by the vacuum pump, and
   wherein the controller reduces the injection amount of the liquid electrolyte when the vacuum attainment time is equal to a first predetermined time value or longer.

2. The device for injecting the liquid electrolyte into the battery according to claim 1,
   further comprising a warning unit giving warning when the vacuum attainment time is equal to a second predetermined time value or longer.

3. The device for injecting the liquid electrolyte into the battery according to claim 1, wherein the injection by the liquid injecting pump is divided into a plurality of times and performed, and
   wherein the controller corrects the injection amount of the liquid electrolyte at a final injection of the plurality of the injections.

* * * * *